US009832395B2

(12) United States Patent
Song et al.

(10) Patent No.: US 9,832,395 B2
(45) Date of Patent: Nov. 28, 2017

(54) INFORMATION PROCESSING METHOD APPLIED TO AN ELECTRONIC DEVICE AND ELECTRONIC DEVICE HAVING AT LEAST TWO IMAGE CAPTURING UNITS THAT HAVE THE SAME IMAGE CAPTURING DIRECTION

(71) Applicant: Lenovo (Beijing) Co., Ltd., Beijing (CN)

(72) Inventors: Wenbin Song, Beijing (CN); Changsheng Liu, Beijing (CN); Yuru Jin, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 67 days.

(21) Appl. No.: 14/500,375

(22) Filed: Sep. 29, 2014

(65) Prior Publication Data
US 2015/0271416 A1 Sep. 24, 2015

(30) Foreign Application Priority Data
Mar. 24, 2014 (CN) .......................... 2014 1 0111715

(51) Int. Cl.
*H04N 5/265* (2006.01)
*H04N 5/232* (2006.01)
(Continued)

(52) U.S. Cl.
CPC ......... *H04N 5/265* (2013.01); *H04N 5/23229* (2013.01); *H04N 5/243* (2013.01); *H04N 5/247* (2013.01)

(58) Field of Classification Search
CPC ..... H04N 5/265; H04N 5/23229; H04N 5/247
See application file for complete search history.

(56) References Cited

U.S. PATENT DOCUMENTS 6,184,781 B1* 2/2001 Ramakesavan .......... B60Q 1/52
340/435
2007/0177819 A1* 8/2007 Ma ..................... G06K 9/00771
382/284

(Continued)

FOREIGN PATENT DOCUMENTS

CN 102165783 8/2011
CN 103546730 1/2014

OTHER PUBLICATIONS

First Office Action dated Jun. 1, 2017 (11 pages including English translation) out of Chinese priority Application No. 201410111715.4.

*Primary Examiner* — Christopher K Peterson
(74) *Attorney, Agent, or Firm* — Brinks Gilson & Lione; G. Peter Nichols

(57) ABSTRACT

The present application describes an information processing method for solving a technical problem of low efficiency in an electronic device. The method includes capturing the first image by a first image capturing unit among at least two image capturing units, and at the same time, capturing a second image by a second image capturing unit among the at least two image capturing units, where the first image and the second image correspond to the same captured object; such that the pixels in the first image is less than those in the second image; transmitting the first image and the second image to an image processing unit; in the process of transmitting the second image, determining a processing way according to at least one characteristic parameter information corresponding to the first image by the image processing unit.

20 Claims, 2 Drawing Sheets

(51) Int. Cl.
*H04N 5/247* (2006.01)
*H04N 5/243* (2006.01)

(56) References Cited

U.S. PATENT DOCUMENTS

| | | | |
|---|---|---|---|
| 2009/0322891 A1* | 12/2009 | Kondo | G06T 3/4038 348/218.1 |
| 2010/0073499 A1 | 3/2010 | Gere | |
| 2013/0300887 A1* | 11/2013 | Ward | H04N 5/2251 348/218.1 |
| 2013/0308012 A1* | 11/2013 | Fukutomi | H04N 1/407 348/229.1 |

* cited by examiner

INFORMATION PROCESSING METHOD APPLIED TO AN ELECTRONIC DEVICE AND ELECTRONIC DEVICE HAVING AT LEAST TWO IMAGE CAPTURING UNITS THAT HAVE THE SAME IMAGE CAPTURING DIRECTION

This application claims priority to Chinese patent application No. CN 201410111715.4 filed on Mar. 24, 2014, the entire contents of which is incorporated herein by reference.

BACKGROUND

The present application relates to the technical field of electronics, and specifically relates to an information processing method and an electronic device.

At present, most of the electronic devices are provided with cameras so as to meets people's shooting demand at any time. Because people's demands for the quality of the image are increasing, devices provided with more pixels often tend to be used to shoot. For example, shooting is conducted through a cell phone or a digital camera with a more-pixel camera so as to obtain an image with better quality. However, in the process of shooting, the quality of the image is also greatly affected by the shooting environment. For example, image noise caused by light and electricity may prevent people's sense organs from understanding the received image information. Therefore, after obtaining the image, a further process for the image is also needed. For example, in the electronic devices, there are various typical scenes, which are determined through a large quantity of practical and statistic data, and processing ways corresponding to the scenes. After the captured image is obtained, a corresponding scene is determined by presuming the working environment of the camera and the noise environment and by analyzing data in the image, so that image enhancing and image processing are conducted according to a processing way corresponding to the scene.

However in the process of practical implementation, analyzing various data of the image is often conducted after the image has been completely transmitted from an image sensor. Due to a limited rate of the image sensor for transmitting image and a relatively larger quantity of image data which needs to be processed in the analysis process, the process from the time when the image begins to be transmitted to the time when the processing way is finally determined is relatively longer, and it takes a longer time, so that the efficiency of the electronic device is lower. Moreover, because the pre-stored typical scenes in the electronic device is limited and they may not completely embrace all the scenes, it is unable to better determine an appropriate processing way with respect to a special scene, thus increasing post-processing load for the image.

In conclusion, there is a technical problem of low efficiency in the electronic device of the related art.

SUMMARY

The embodiment of the present application provides a display method to solve the technical problem of inferior display effect of the electronic device in the related art.

An information processing method applied to an electronic device which comprises at least two image capturing units that have the same image capturing direction, the method comprising:

capturing the first image by the first image capturing unit among the at least two image capturing units, and at the same time, capturing the second image by the second image capturing unit among the at least two image capturing units, and the first image and the second image are corresponding to the same capturing objects; wherein, the pixels in the first image is less than those in the second image;

transmitting the first image and the second image to an image processing unit in the electronic device;

in the process of transmitting the second image, determining a processing way according to at least one characteristic parameter information corresponding to the first image by the image processing unit;

after the transmission of the second image is completed, conducting the synthesis process for the first image and the second image by the image processing unit to obtain the corresponding synthesis image;

processing the synthesis image in accordance with the processing way.

An electronic device, comprising at least two image capturing units which have the same image capturing direction, the electronic device comprising:

a first image capturing unit among the at least two image capturing units, which captures a first image, a second image capturing unit among the at least two image capturing units, which captures a second image at the same time, and the first image and the second image being corresponding to the same capturing objects; wherein, the pixels in the first image are less than those in the second image;

a transmitting unit for transmitting the first image and the second image to an image processing unit in the electronic device;

a processing unit, which includes a first processing module, a synthesis module and a second processing module, wherein the first processing module for determining, in the process of transmitting the second image, a processing way through the image processing unit according to at least one characteristic parameter information corresponding to the first image;

the synthesis module for conducting, after the transmission of the second image is completed, a synthesis process for the first image and the second image through the image processing unit to obtain a corresponding synthesis image;

the second processing module for processing the synthesis image in accordance with the processing way.

In the embodiment of the present application, since the at least two image capturing units have the same image capturing direction, the first image and the second image, which are at the same scene and have different pixels, can be captured at the same time by the at least two image capturing units, and thus the first image and the second image can be outputted by the image sensor and can be transmitted to the image processing unit for synthesis process, that is, the at least two image capturing units can form heterogeneous array cameras in the electronic device, and the captured image can be obtained more conveniently by forcing the captured image to be synthesized. Wherein, when the first image and the second image are captured, since the time required for outputting image is related to the pixels, the output time required for outputting the first image with less pixels is shorter, and after the first image it outputted, the at least one characteristic parameter information can be extracted, and therefore, the processing way can be determined according to the at least one parameter information. For example, the at least one characteristic parameter information may be the image noise or the image luminance, and because the first image and the second image are form the same environment, the same image noise and the same image luminance are comprised, and therefore, the processing way determined according to the first image can be used to process the synthesized image, that is, the first image is processed by using a transmitting time interval existed between the first image and the second image to determine the processing way, and there is no need to spend time on processing the second image so as to improve the efficiency of the electronic device.

DETAILED DESCRIPTION

Figure 1:
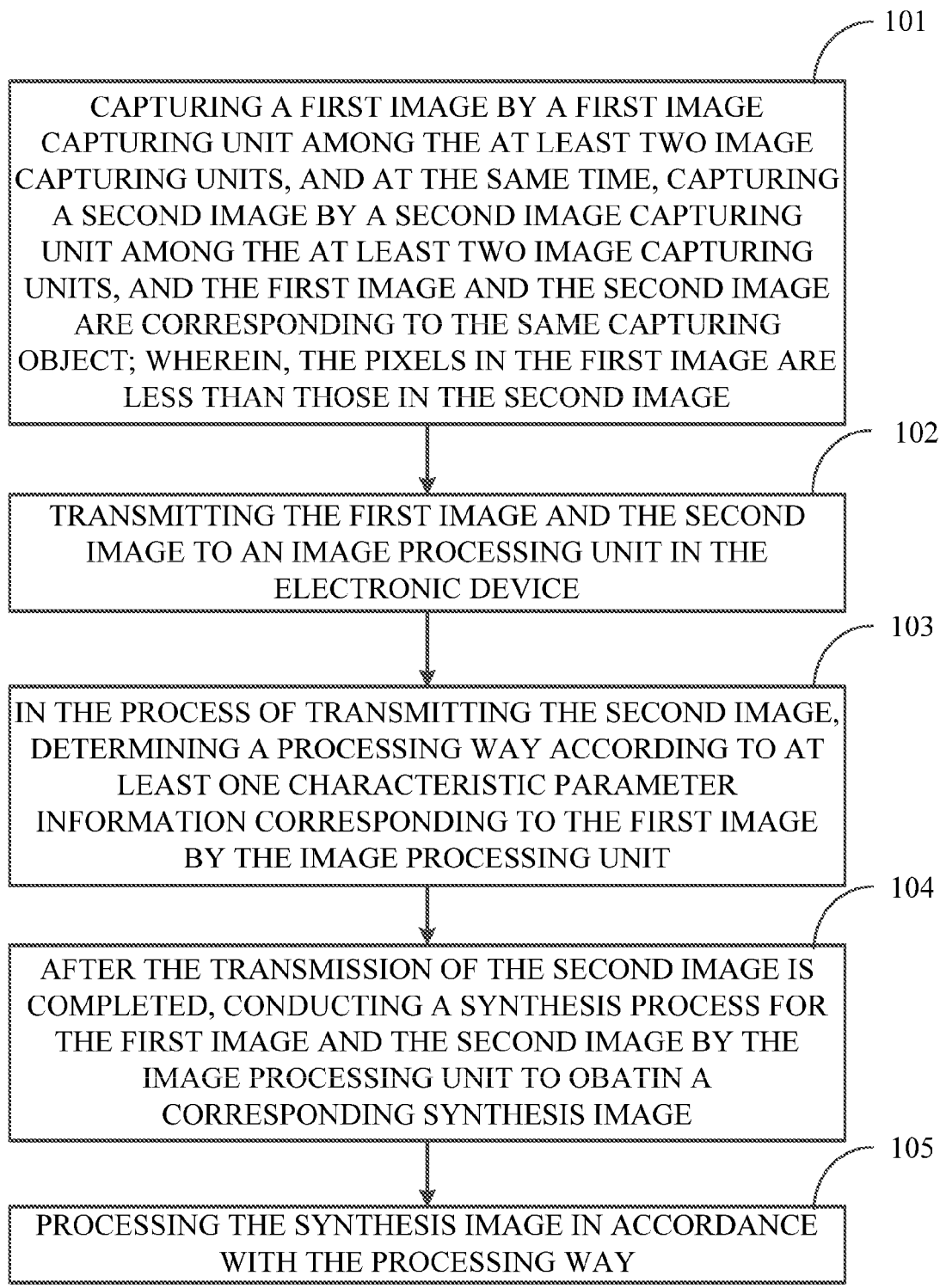
FIG. 1 is the primary flowchart of the information processing method in an embodiment of the present application.

The present application provides an information processing method applied to an electronic device. The electronic device comprises at least two image capturing units which have the same image capturing direction. The method comprises capturing the first image by the first image capturing unit among the at least two image capturing units, and at the same time, capturing the second image by the second image capturing unit among the at least two image capturing units, and the first image and the second image are corresponding to the same capturing objects; wherein, the pixels in the first image are less than those in the second image; transmitting the first image and the second image to an image processing unit in the electronic device; in the process of transmitting the second image, determining a processing way according to at least one characteristic parameter information corresponding to the first image by the image processing unit; after the transmission of the second image is completed, conducting the synthesis process for the first image and the second image by the image processing unit to obtain the corresponding synthesis image; processing the synthesis image in accordance with the processing way.

In the embodiment of the present application, since the at least two image capturing units have the same image capturing direction, the first image and the second image, which are at the same scene and have different pixels, can be captured at the same time by the at least two image capturing units, and thus the first image and the second image can be outputted by the image sensor and can be transmitted to the image processing unit for synthesis process, that is, the at least two image capturing units can form heterogeneous array cameras in the electronic device, and the captured image can be obtained more conveniently by forcing the captured image to be synthesized. Wherein, when the first image and the second image are captured, since the time required for outputting image is related to the pixels, the output time required for outputting the first image with less pixels is shorter, and after the first image it outputted, the at least one characteristic parameter information can be extracted, and therefore, the processing way can be determined according to the at least one parameter information. For example, the at least one characteristic parameter information may be the image noise or the image luminance, and because the first image and the second image are form the same environment, the same image noise and the same image luminance are comprised, and therefore, the processing way determined according to the first image can be used to process the synthesized image, that is, the first image is processed by using a transmitting time interval existed between the first image and the second image to determine the processing way, and there is no need to spend time on processing the second image so as to improve the efficiency of the electronic device.

Hereinafter, the technical solutions of the embodiment of the present application will be described clearly and completely with reference to the accompanying drawings in the embodiment of the present application in order to make the objects, the technical solutions and the advantages of the embodiment of the present application clearer. It is obvious that the described embodiments are only a part of embodiments of the present application, but not all embodiments. Based on the embodiments of the present application, all the other embodiments which are obtained, under the premise that there is no creative effort, by those skilled in the art will fall in the scope protected by the present application.

In embodiments of the present application, the electronic devices could be different kinds of electronic devices such as PC (personal computer), laptop, PAD (tablet computer), cell phone. The present application is not limited thereto.

In addition, the term "and/or" used herein only refers to an association relationship for describing associated objects, indicating that there may be three kinds of relationship. For example, A and/or B may indicate the following three cases: only A, both A and B, only B. Moreover, the character "/" used herein generally indicates a "or" relationship between associated objects before and after "/".

The preferred embodiments of the present application will be described below in detail in conjunction with the accompanying Figures.

Referring to FIG. 1, there provides an information processing method in the embodiment of the present application. The method is applied to an electronic device which comprises at least two image capturing units. The at least two image capturing units have the same image capture direction. The method can comprise the following steps:

Step 101: capturing a first image by a first image capturing unit among the at least two image capturing units, and at the same time, capturing a second image by a second image capturing unit among the at least two image capturing units, and the first image and the second image are corresponding to the same capturing object; wherein, the pixels in the first image are less than those in the second image.

In the embodiment of the present application, all of the at least two image capturing units comprised in the electronic device can be a plurality of cameras provided in the electronic device. Since the at least two image capturing units have the same image capturing direction, it is facilitated to capture a plurality of images within the same scene for processing such as synthesizing, so as to obtain a higher quality image. Among them, the first image capturing unit and the second image capturing unit can be array cameras with a better shooting effect, which are arranged in an array way and are configured in the electronic device For example, in the embodiment of the present application, the respective image capturing units among the at least two image capturing units may be mutually different or may be partly the same. For example, if the pixels in the first image capturing unit can be less than those in the second image capturing unit, then the pixels in the first image captured by the first image capturing unit are less than those in the second image. Therefore, when the at least two image capturing units are arranged in the array way, heterogeneous array cameras can be configured and thus images in various scenes can be captured through the heterogeneous array cameras.

Step 102: transmitting the first image and the second image to an image processing unit in the electronic device.

In the embodiment of the present application, after the first image and the second image are captured by the at least two image capturing units, the first image and the second image can be transmitted to the image processing unit for further processes. Generally, after the images are captured, an image sensor outputs image data according to the pixels of the images. Therefore, when the pixels in the first image and the second image are different, the time for outputting data is also different. For example, if the pixels in the first image is 20 W and the pixels in the second image is 120 W, then the time required for outputting the first image may be 1 t and the time required for outputting the second image may be 6 t, and thus the time for outputting the first image is less than one third of the time for outputting the second image.

Step 103: in the process of transmitting the second image, determining a processing way according to at least one characteristic parameter information corresponding to the first image by the image processing unit.

In the embodiment of the present application, the processing way can be a process, which can be used for various environment factors when the first image and the second image are captured, determined according to the at least one characteristic parameter information of the first image. For example, if the influence of the environment noise on the image quality needs a de-noising image processing for the entire image, then a corresponding processing way can be determined through a distribution feature of the noise point parameter in the image.

In the embodiment of the present application, because when outputting the data, the first image with less pixels will be outputted before the second image, in the process of transmitting the second image, that is, before the second image is completely outputted, the first image can be processed by the image processing unit to obtain the at least one characteristic parameter information, so as to determine the process way according to the at least one characteristic parameter information.

In the embodiment of the present application, the at least one characteristic parameter information can be image luminance parameter information and/or image noise parameter information. Generally, a plurality of images captured in the same capturing area by the at least two image capturing units have the same image characteristics, such as image noise, image colors.

For example, in the embodiment of the present application, when the at least one characteristic parameter information is the image luminance parameter information, determining a process way according to the at least one characteristic parameter information corresponding to the first image can comprise: determining image grayscale information of the first image; determining the image luminance parameter information corresponding to the first image according to the image grayscale information; determining the processing way according the image luminance parameter information.

Wherein, specifically, determining the image grayscale information can be conducted in accordance with an image grayscale histogram corresponding to the first image. The image grayscale histogram is a function of grayscale, and it can indicate the number of the pixels with a certain grayscale in the image, which reflects a frequency that a certain grayscale occurs in the image.

In the embodiment of present application, the image grayscale information can be an image grayscale corresponding to the first image. Generally, a complete image is composed of three channels, that is, red, green and blue channels. The thumbnails of the red, green and blue channels are displayed on grayscale. Different grayscale color levels are used to indicate the proportions of "red, green, blue" in the image. Pure white in the channels represents that the color light here is brightest, and the luminance level is 255. A color change is actually an indirect adjustment for the channels grayscale diagram.

In the embodiment of the present application, determining the image luminance parameter information corresponding to the first image according to the image grayscale information can comprise: determining the number of specific pixel points according to the image grayscale information; wherein, the specific pixel points are the pixel points corresponding to a first grayscale which is greater than or equal to a preset grayscale in the first image; determining a first percentage that the number of the specific pixel points accounts for the number of all pixel points in the first image; determining the image luminance parameter information according to the first proportion.

In the embodiment of the present application, each pixel point in the first image has a sample color, and the value of the grayscale corresponding to the sample color can be 0-255 so that each pixel point can present, according to the grayscale, visual effects from the darkness black to the brightest white.

Generally, the pixel is also called the resolution, and it refers to the number of horizontal and vertical pixel sets that can be displayed, the value of which is typically corresponding to several display ways. When the resolution is 1366× 768, it indicates that there are 1366 pixel points divided in the horizontal direction of a plasma screen and 768 pixel points divided in the vertical direction of the plasma screen. The higher the resolution is, the larger scope the resolution can be received is and the wider the range for receiving a plasma signal is.

In the embodiment of the present application, the grayscale can refer to the light and dark difference of displaying pixel points in a black-and-white display, and in a color display, the grayscale indicates color difference, and the more the grayscale is, the more clear and vivid the levels of the image is. Currently, similar to the light and dark difference in the black-and-white display, the grayscale is divided into 256 scales, and the higher the grayscale is, the darker the image is. The preset grayscale can be a grayscale autoset by the electronic device according to the detected ambient light. For example, when the sky is cloudy, the preset grayscale can be 180 so as to make the chromaticity of the image brighter. Alternatively, the present grayscale can be user-definable. For example, in the shooting process, the user, according to the shooting demand, can obtain images with various displaying effects by adjusting the preset grayscale.

For example, in the embodiment of the present application, the process of determining the number of the specific pixel points according to the image grayscale information can also be conducted according to the image grayscale histogram. For example, since each pixel point has a corresponding grayscale, the number of the pixel points corresponding to each grayscale can be acquainted comparatively clearly by counting the times that the pixel points of respective grayscales occur in the image grayscale histogram. Thus, according to the first grayscale, the number of the specific pixel points can be determined in the image grayscale histogram. Wherein, the first grayscale can refer to a grayscale which is higher than the preset grayscale in the image grayscale histogram and which is corresponding to the maximum of pixel points.

For example, after the number of the specific pixel points is determined, the first percentage can be determined according to the pixels in the first image. Wherein, the total number of the pixel points in the first image can be determined according to the relationship between the pixels and the resolution. For example, when the pixels in the first image is 30 W, the resolution corresponding thereto is 640×480, that is, the first image totally comprises 307200 pixel points. If the determined number of the specific pixel points is 107520, then it can be known that the first percentage is about 35%.

Thus, the image luminance parameter information can be determined according to the first percentage and specifically, the process can be: determining whether the first percentage is bigger than a preset percentage threshold; when the first percentage is bigger than the preset percentage threshold, determining an image luminance value corresponding to the image luminance parameter information as a first luminance value; when the first percentage is not bigger than the preset percentage threshold, determining the image luminance value corresponding to the image luminance parameter information as a second luminance value, and the second image luminance value is smaller than the first image luminance value.

In the embodiment of the present application, the first luminance value can be a number indicating a luminance corresponding to the grayscale, and the image luminance and the image grayscale have the same value. For example, when the first percentage is bigger the preset percentage threshold, the first grayscale can be determined as the first luminance value. That is, when the first percentage is bigger than the preset percentage threshold, if the first grayscale is 180, then the first luminance value can be determined as 180.

In the embodiment of the present application, the preset percentage threshold can be determined in advance according to the grayscale of the first image corresponding to the specific pixel points. For example, when the first grayscale corresponding to the specific pixel points is 160, that is, the specific pixel points is a relatively normal portion in the first image, the preset percentage can be determined as 50%, and when the first percentage is bigger than the preset percentage, it means that more than half of the pixel points in the first image are corresponding to higher grayscales, and thus the first luminance value can be determined, for example, the first luminance value is 160.

If the first percentage is not bigger than the preset percentage, then a value between the preset grayscale and the first grayscale can be determined as the second luminance value. For example, the first grayscale is 150 and the preset grayscale is 110, and if the first percentage is not bigger than the preset percentage, then the second luminance value can be 130.

For example, in the embodiment of the present application, determining the processing way according the image luminance parameter information can comprise: determining an absolute value of a difference between the first percentage and the preset percentage threshold; determining a adjusting luminance value according to the absolute value; when the image luminance value corresponding to the image luminance parameter information is the first luminance value, determining the processing way is subtracting the adjusting luminance value from the synthesis image luminance value corresponding to the synthesis image; alternatively, when the image luminance value corresponding to the image luminance parameter information is the second luminance value, determining the processing way is adding the adjusting luminance value to the synthesis image luminance value corresponding to the synthesis image.

In the embodiment of the present application, the adjusting luminance value is able to reflect a degree to be increased or decreased by which the current luminance of the first image is adjusted to a normal luminance. The luminance value can be an adjusting value which is auto-determined in accordance with a preset rule by the electronic device according to the absolute value. For example, after the absolute value is obtained, an absolute value scope where the absolute value is located can be determined, and then the corresponding adjusting luminance value can be determined according to the corresponding relationship between the absolute value scope and the adjusting value. For example, when the absolute value is 10%, the absolute scope where the absolute value is located is a first absolute scope, such as 5%-10%, and a first adjusting value corresponding to the first absolute value scope is 3, then the first adjusting value can be determined as the adjusting luminance value, and thus the processing way can be determined according to the image luminance value.

In the embodiment of the present application, when the at least one characteristic parameter information is the image noise parameter information, determining a process way according to the at least one characteristic parameter information corresponding to the first image can comprise: obtaining an image histogram information corresponding to the first image; determining the image noise parameter information corresponding to the first image according to the image histogram information; determining the processing way according to the image noise parameter information.

At present, in most digital image systems, the process of determining the image noise is the same as that of inputting image, both of which are transforming multi-dimensional images into one dimensional electronic signal by using the way of first freezing and then scanning, and then making processing transformations such as disposing, storing and transmitting the signal, and at last composing the signal as the multi-dimensional image signal. In these processes, the electronical system and external influence will make the accurate analysis of the image noise become very complicated. Therefore, in the embodiment of the present application, when the at least one characteristic parameter information is the image noise parameter information, the corresponding image noise parameter information is determined mainly through the parameter information of the image histogram information.

For example, in the embodiment of the present application, determining the image noise parameter information corresponding to the first image according to the image histogram information can comprise: obtaining an image noise average value corresponding to the first image according to the image histogram information; determining the image noise parameter information corresponding to the first image according to the image noise average value.

Generally, since the image noise may cast an influence to both the luminance of the pixel in the image and the grayscale thereof, the noise type corresponding to the first image can be determined by analyzing the grayscale and the luminance corresponding to the pixel points in the image. Therefore, in the embodiment of the present application, the image histogram information can refer to an information corresponding to the image grayscale histogram, both of which can have the same grayscale value distribution so that the image noise average value which is able to reflect a trend of the noise distribution for the image noise in the first image can be determined according to the function relationship therein. Wherein, a formula for the image noise average value can be as follows:

$$\sum_{i=0}^{255} i*a[i]/\text{resolution} \quad (1)$$

In the formula (I), a[i] represents the number of the pixel points corresponding to the ith grayscale in the first image, and the resolution is the pixels in the first image.

For example, in the embodiment of the present application, determining the image noise parameter information corresponding to the first image according to the image noise average value can comprise: calculating a standard deviation of the first image according to the image noise average value; determining a first preset standard deviation, which is successfully matched with the standard deviation, among a plurality of preset standard deviations; wherein, different preset standard deviations are standard deviations that are preset and corresponding to different image noise parameter information; determining a first image noise parameter information corresponding to the first preset standard deviation as the image noise parameter information corresponding to the first image.

That is, in the embodiment of the present application, after the image noise average value is determined according to the image histogram information, the standard deviation of the first image can be further determined according to the image noise average value, and a calculating formula for the standard deviation is as follows:

$$\sqrt{\sum_{i=0}^{255}(i-averagevalue)^2*a[i]/\text{resolution}} \quad (2)$$

In the formula (2), the resolution is the pixels in the first image.

For example, in the embodiment of the present application, the plurality of the preset standard deviations comprised in the electronic device can be a value, which is determined according to a statistically practical data, corresponding to the image noise parameter information. Thus, after the first preset standard deviation is determined, the first image noise parameter information corresponding thereto can be determined as the image noise parameter information.

In the embodiment of the present application, specifically, determining the processing way according to the image noise parameter information can be: determining the noise type corresponding to the first image according to the image noise parameter information; determining a noise processing way related to the noise type as the processing way. That is, after determining the image noise information, the noise type of the first image, such as salt & pepper noise, Gaussian/Rayleigh noise or other types of noise, can be determined. Therefore, an relatively appropriate processing method for the type of image noise among the current image noise processing methods can be known, that is, the processing way is determined.

Step 104: after the transmission of the second image is completed, conducting the synthesis process for the first image and the second image by the image processing unit to obtain the corresponding synthesis image.

In the embodiment of the present application, the synthesis module can force the first image and the second image to be synthesized through an image synthesis technology to obtain the synthesis image. Wherein, the image synthesis technology refers to changing multi-spectral black-and-white images into color images through multi-spectral image color synthesis.

Step 105: processing the synthesis image in accordance with the processing way.

In the embodiment of the present application, since the first image and the second image are captured from the same object within the same environment, the at least one characteristic parameter information related to the environment in the first image and the second image are the same. Therefore, after the synthesis image is obtained, the synthesis image can be processed by the processing way determined according to the characteristic parameter information in the first image.

For example, in the embodiment of the invention, processing the synthesis image in accordance with the processing way can comprise: determining a first correction parameter with respect to the first image according to the at least one characteristic parameter information, and conducting correcting process for the synthesis image according to the first correction parameter.

Wherein, when the at least one characteristic parameter information is the image luminance parameter information, determining a first correction parameter with respect to the first image according to the at least one characteristic parameter information, and conducting correcting process for the synthesis image according to the first correction parameter can comprise: setting the adjusting luminance value as the first correction parameter; conducting correcting process for the synthesis image according to the first correction parameter.

Figure 2:
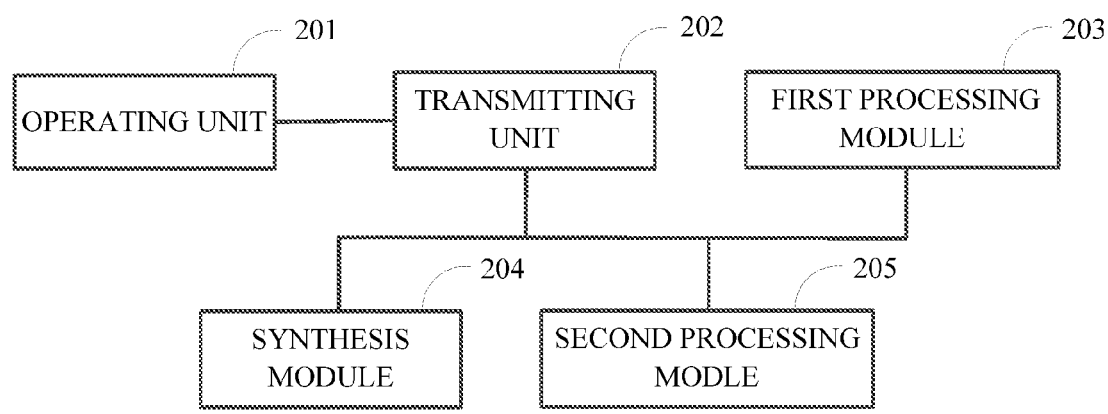
FIG. 2 is the primary structure diagram of the electronic device in an embodiment of the present application.

Referring to FIG. 2, the present application provides an electronic device, comprising at least two image capturing units which have the same image capturing direction. The electronic device can comprise an operating unit 201, a transmitting unit 202, and a processing unit, which includes a first processing module 203, a synthesis module 204 and a second processing module 205.

The operating unit 201 can be used for capturing the first image by the first image capturing unit among the at least two image capturing units, and at the same time, for capturing the second image by the second image capturing unit among the at least two image capturing units, and the first image and the second image are corresponding to the same capturing objects; wherein, the pixels in the first image are less than those in the second image.

The transmitting unit 202 can be used for transmitting the first image and the second image to the image processing unit in the electronic device.

The first processing module 203 can be used for, in the process of transmitting the second image, determining a processing way through the image processing unit according to at least one characteristic parameter information corresponding to the first image.

The synthesis module 204 can be used for, after the transmission of the second image is completed, conducting the synthesis process for the first image and the second image through the image processing unit to obtain a corresponding synthesis image.

The second processing module 205 can be used for processing the synthesis image in accordance with the processing way.

For example, the second processing module 205 can be specifically used for determining a first correction parameter with respect to the first image according to the at least one characteristic parameter information, and conducting correcting process for the synthesis image according to the first correction parameter.

Wherein, the at least one characteristic parameter information is the image luminance parameter information and/or the image noise parameter information.

For example, when the at least one characteristic parameter information is the image luminance parameter information, the first processing module 203 can also be used for determining image grayscale information in the first image; determining the image luminance parameter information corresponding to the first image according to the image grayscale information; determining the processing way according to the image luminance parameter information.

For example, the first processing module 203 is used for determining the image luminance parameter information corresponding to the first image according to the image grayscale information, and particularly used for: determining the number of specific pixel points according to the image grayscale information; wherein, the specific pixel points are the pixel points corresponding to the first grayscale which is more than or equal to the preset grayscale; determining the first percentage that the number of the specific pixel points accounts for the number of all the pixel points in the first image; determining the image luminance parameter information according to the first percentage.

For example, the first processing module 203 is particularly used for determining the image luminance parameter information according to the first percentage, and also particularly used for: determining whether the first percentage is bigger than a preset percentage threshold; when the first percentage is bigger the preset percentage threshold, determining an image luminance value corresponding to the image luminance parameter information as a first luminance value; when the first percentage is not bigger than the preset percentage threshold, determining an image luminance value corresponding to the luminance parameter information as a second luminance value, the second image luminance value is smaller than the first image luminance value.

For example, the first processing module 203 is used for determining the processing way according to the image luminance parameter information, and may particularly be used for: determining an absolute value of a difference between the first percentage and the preset percentage threshold; determining a adjusting luminance value according to the absolute value; when the image luminance value corresponding to the image luminance parameter information is the first luminance value, determining the processing way is subtracting the adjusting luminance value from the synthesis image luminance value corresponding to the synthesis image; alternatively, when the image luminance value corresponding to the image luminance parameter information is the second luminance value, determining the processing way is adding the adjusting luminance value to the synthesis image luminance value corresponding to the synthesis image.

For example, the second processing module 205 is used for determining the first correction parameter with respect to the first image according to the at least one characteristic parameter information, and conducting the correcting process for the synthesis image according to the first correction parameter, and may particularly be used for: determining the adjusting luminance value as the first correction parameter; conducting the correcting processing to the synthesis image according to the first correction parameter.

For example, when the at least one characteristic parameter information is the image noise parameter information, the first processing module 203 may be particularly used for: obtaining an image histogram information corresponding to the first image; determining the image noise parameter information corresponding to the first image according to the image histogram information; determining the processing way according to the image noise parameter information.

For example, the first processing module 203 is used for determining the image noise parameter information corresponding to the first image according to the image histogram information, and may particularly be used for: obtaining an image noise average value corresponding to the first image according to the image histogram information; determining the image noise parameter information corresponding to the first image according to the image noise average value.

For example, the first processing module 203 is particularly used for determining the image noise parameter information corresponding to the first image according to the image noise average value, and may particularly be used for: calculating a standard deviation of the first image according to the image noise average value; determining a first preset standard deviation, which is successfully matched with the standard deviation, among a plurality of preset standard deviations; wherein, different preset standard deviations are standard deviations that are preset and corresponding to different image noise parameter information; determining a first image noise parameter information corresponding to the first preset standard deviation as the image noise parameter information corresponding to the first image.

For example, the first processing module 203 is particularly used for determining a processing way through the image processing unit according to the at least one characteristic parameter information corresponding to the first image, and may particularly used for: determining the noise type corresponding to the first image according to the image noise parameter information; determining a noise processing way related to the noise type as the processing way.

The present application provides an information processing method applied to an electronic device. The electronic device comprises at least two image capturing units which have the same image capturing direction. The method comprises capturing the first image by the first image capturing unit among the at least two image capturing units, and at the same time, capturing the second image by the second image capturing unit among the at least two image capturing units, and the first image and the second image are corresponding to the same capturing objects; wherein, the pixels in the first image are less than those in the second image; transmitting the first image and the second image to an image processing unit in the electronic device; in the process of transmitting the second image, determining a processing way according to at least one characteristic parameter information corresponding to the first image by the image processing unit; after the transmission of the second image is completed, conducting the synthesis process for the first image and the second image by the image processing unit to obtain the corresponding synthesis image; processing the synthesis image in accordance with the processing way.

In the embodiment of the present application, since the at least two image capturing units have the same image capturing direction, the first image and the second image, which are at the same scene and have different pixels, can be captured at the same time by the at least two image capturing units, and thus the first image and the second image can be outputted by the image sensor and can be transmitted to the image processing unit for synthesis process, that is, the at least two image capturing units can form heterogeneous array cameras in the electronic device, and the captured image can be obtained more conveniently by forcing the captured image to be synthesized. Wherein, when the first image and the second image are captured, since the time required for outputting image is related to the pixels, the output time required for outputting the first image with less pixels is shorter, and after the first image it outputted, the at least one characteristic parameter information can be extracted, and therefore, the processing way can be determined according to the at least one parameter information. For example, the at least one characteristic parameter information may be the image noise or the image luminance, and because the first image and the second image are form the same environment, the same image noise and the same image luminance are comprised, and therefore, the processing way determined according to the first image can be used to process the synthesized image, that is, the first image is processed by using a transmitting time interval existed between the first image and the second image to determine the processing way, and there is no need to spend time on processing the second image so as to improve the efficiency of the electronic device. Specifically, the computer program corresponding to the information processing method in the embodiment of the present application can be stored in storage medium such as compact disk, hard disk, USB flash disk, and when an instruction of the computer program corresponding to the information processing method in the storage medium is read or executed by an electronic device, the following steps are comprised:

capturing the first image by the first image capturing unit among the at least two image capturing units, and at the same time, capturing the second image by the second image capturing unit among the at least two image capturing units, and the first image and the second image are corresponding to the same capturing objects; wherein, the pixels in the first image are less than those in the second image transmitting the first image and the second image to an image processing unit in the electronic device;

in the process of transmitting the second image, determining a processing way according to at least one characteristic parameter information corresponding to the first image by the image processing unit;

after the transmission of the second image is completed, conducting the synthesis process for the first image and the second image by the image processing unit to obtain the corresponding synthesis image;

processing the synthesis image in accordance with the processing way.

For example, in the particular process that the instruction of the computer program stored in the storage medium, which is corresponding to the step i.e. processing the synthesis image in accordance with the processing way, is being executed, the following steps are particularly included: determining a first correction parameter with respect to the first image according to the at least one characteristic parameter information, and conducting correcting process for the synthesis image according to the first correction parameter.

For example, in the particular process that the instruction of the computer program stored in the storage medium, which is corresponding to the step i.e. determining a processing way according to at least one characteristic parameter information corresponding to the first image, is being executed, the following steps are particularly included: determining the image grayscale information in the first image; determining the image luminance parameter information corresponding to the first image according to the image grayscale information; determining the processing way according to the image luminance parameter information.

For example, in the particular process that the instruction of the computer program stored in the storage medium, which is corresponding to the step i.e. determining the image luminance parameter information corresponding to the first image according to the image grayscale information, is being executed, the following steps are particularly included: determining the number of the specific pixel points according to the image grayscale information; wherein, the specific pixel points are the pixel points corresponding to the first grayscale which is more than or equal to the preset grayscale; determining the first percentage that the number of the specific pixel points accounts for the number of all the pixel points in the first image; determining the image luminance parameter information according to the first percentage.

For example, in the particular process that the instruction of the computer program stored in the storage medium, which is corresponding to the step i.e. determining the image luminance parameter information according to the first percentage, is being executed, the following steps are particularly included: determining whether the first percentage is bigger than a preset percentage threshold; when the first percentage is bigger the preset percentage threshold, determining an image luminance value corresponding to the image luminance parameter information as a first luminance value; when the first percentage is not bigger than the preset percentage threshold, determining a luminance value corresponding to the luminance parameter information as a second luminance value, the second image luminance value is smaller than the first image luminance value.

For example, in the particular process that the instruction of the computer program stored in the storage medium, which is corresponding to the step i.e. determining the processing way according to the image luminance parameter information, is being executed, the following steps are particularly included: determining the absolute value of the difference between the first percentage and the preset percentage threshold; determining a adjusting luminance value according to the absolute value; when the image luminance value corresponding to the image luminance parameter information is the first luminance value, determining the processing way is subtracting the adjusting luminance value from the synthesis image luminance value corresponding to the synthesis image; alternatively, when the image luminance value corresponding to the image luminance parameter information is the second luminance value, determining the processing way is adding the adjusting luminance value to the synthesis image luminance value corresponding to the synthesis image.

For example, in the particular process that the instruction of the computer program stored in the storage medium, which is corresponding to the step i.e. determining a first correction parameter with respect to the first image according to the at least one characteristic parameter information and conducting correcting process for the synthesis image according to the first correction parameter, is being executed, the following steps are particularly included: determining the adjusting luminance value as the first correction parameter; conducting a correcting processing to the synthesis image according to the first correction parameter.

For example, when the at least one characteristic parameter information is the image noise parameter information, in the particular process that the instruction of the computer program stored in the storage medium, which is corresponding to the step i.e. determining a processing way according to at least one characteristic parameter information corresponding to the first image, is being executed, the following steps are particularly included: obtaining an image histogram corresponding to the first image; determining the image noise parameter information corresponding to the first image according to the image histogram information; determining the processing way according to the image noise parameter information.

For example, in the particular process that the instruction of the computer program stored in the storage medium, which is corresponding to the step i.e. determining a processing way according to at least one characteristic parameter information corresponding to the first image, is being executed, the following steps are particularly included: obtaining an image noise average value corresponding to the first image according to the image histogram information; determining the image noise parameter information corresponding to the first image according to the image noise average value.

For example, in the particular process that the instruction of the computer program stored in the storage medium, which is corresponding to the step i.e. determining the image noise parameter information corresponding to the first image according to the image noise average value, is being executed, the following steps are particularly included: calculating a standard deviation of the first image according to the image noise average value; determining a first preset standard deviation, which is successively matched with the standard deviation, among a plurality of preset standard deviations; wherein, different preset standard deviations are standard deviations that are preset and corresponding to different image noise parameter information; determining a first image noise parameter information corresponding to the first preset standard deviation as the image noise parameter information corresponding to the first image.

For example, in the particular process that the instruction of the computer program stored in the storage medium, which is corresponding to the step i.e. determining the processing way according to the image noise parameter information, is being executed, the following steps are particularly included: determining the noise type corresponding to the first image according to the image noise parameter information; determining a noise processing way related to the noise type as the processing way.

It is obvious that those skilled in the related art can make various modifications and transformations without departing from the spirit and the scope of the present application. Thus, if such modifications and transformations belong to the scope of the present application and the equivalents thereof, then the present application is also intended to include such modifications and transformations.

The invention claimed is:

1. An information processing method applied to an electronic device which has at least two image capturing units that have the same image capturing direction, the method comprising:
   capturing the first image by the first image capturing unit, and at the same time, capturing the second image by the second image capturing unit, and the first image and the second image correspond to an identical captured object; wherein, the pixels of the first image is less than those of the second image;
   transmitting the first image and the second image to an image processing unit in the electronic device;
   in the process of transmitting the second image, determining a processing way according to at least one characteristic parameter information corresponding to the first image by the image processing unit;
   after the transmission of the second image is completed, conducting the synthesis process for the first image and the second image by the image processing unit to obtain the corresponding synthesis image, wherein the image processing unit is configured to change multi-spectral black-and-white images into color images through multi-spectral image color synthesis; and,
   processing the synthesis image in accordance with the processing way.

2. The method according to claim 1, wherein processing the synthesis image in accordance with the processing way comprises determining a first correction parameter with respect to the first image according to the at least one characteristic parameter information, and conducting a correcting process for the synthesis image according to the first correction parameter.

3. The method according to claim 1, wherein the at least one characteristic parameter information is an image luminance parameter information and/or an image noise parameter information.

4. The method according to claim 3, wherein when the at least one characteristic parameter information is the image luminance parameter information, the determining a process way according to the at least one characteristic parameter information corresponding to the first image comprises:
   determining an image grayscale information of the first image;
   determining the image luminance parameter information corresponding to the first image according to the image grayscale information;
   determining the processing way according the image luminance parameter information.

5. The method according to claim 4, wherein the determining the image luminance parameter information corresponding to the first image according to the image grayscale information comprises:
   determing the number of the specific pixel points according to the image grayscale information; wherein, the specific pixel points are, in the first image, pixel points corresponding to a first grayscale which is more than or equal to a preset grayscale;
   determining a first percentage that the number of the specific pixel points accounts for the number of all the pixel points in the first image;
   determining the image luminance parameter information according to the first percentage.

6. The method according to claim 5, wherein the determining the image luminance parameter information according to the first percentage comprises:
   determining whether the first percentage is bigger than a preset percentage threshold;
   when the first percentage is bigger the preset percentage threshold, determining an image luminance value corresponding to the image luminance parameter information as a first luminance value;
   when the first percentage is not bigger than the preset percentage threshold, determining a luminance value corresponding to the luminance parameter information is a second luminance value, the second image luminance value being smaller than the first image luminance value.

7. The method according to claim 6, wherein the determining the processing way according to the image luminance parameter information comprises:
- determining an absolute value of a difference between the first percentage and the preset percentage threshold;
- determining a adjusting luminance value according to the absolute value;
- wherein when the image luminance value corresponding to the image luminance parameter information is the first luminance value, determining the processing way is subtracting the adjusting luminance value from the synthesis image luminance value corresponding to the synthesis image; alternatively, when the image luminance value corresponding to the image luminance parameter information is the second luminance value, determining the processing way is adding the adjusting luminance value to the synthesis image luminance value corresponding to the synthesis image.

8. The method according to claim 7, wherein the determining a first correction parameter with respect to the first image according to the at least one characteristic parameter information, conducting correcting process for the synthesis image according to the first correction parameter comprise:
- determining the adjusting luminance value as the first correction parameter;
- conducting a correcting processing to the synthesis image according to the first correction parameter.

9. The method according to claim 3, wherein when the at least one characteristic parameter information is an image noise parameter information, the determining a process way according to the at least one characteristic parameter information corresponding to the first image comprises:
- obtaining an image histogram corresponding to the first image;
- determining the image noise parameter information corresponding to the first image according to the image histogram information;
- determining the processing way according to the image noise parameter information.

10. The method according to claim 9, wherein determining the image noise parameter information corresponding to the first image according to the image histogram information comprises:
- obtaining an image noise average value corresponding to the first image according to the image histogram information; and
- determining the image noise parameter information corresponding to the first image according to the image noise average value.

11. The method according to claim 10, wherein the determining the image noise parameter information corresponding to the first image according to the image noise average value comprises:
- calculating a standard deviation of the first image according to the image noise average value;
- determining a first preset standard deviation, which is successfully matched with the standard deviation, among a plurality of preset standard deviations; wherein, different preset standard deviations are standard deviations that are preset and corresponding to different image noise parameter information;
- determining a first image noise parameter information corresponding to the first preset standard deviation as the image noise parameter information corresponding to the first image.

12. The method according to claim 11, wherein the determining the processing way according to the image noise parameter information comprises:
- determining a noise type corresponding to the first image according to the image noise parameter information; and
- determining a noise processing way related to the noise type as the processing way.

13. An electronic device, having at least two image capturing units which have the same image capturing direction, the electronic device comprising:
- a first image capturing unit among the at least two image capturing units, which captures a first image,
- a second image capturing unit among the at least two image capturing units, which captures a second image at the same time, and the first image and the second image being corresponding to the same capturing objects; wherein, the pixels of the first image are less than those of the second image;
- a transmitting unit for transmitting the first image and the second image to an image processing unit in the electronic device;
- a processing unit, which includes a first processing module, a synthesis module and a second processing module, wherein
- the first processing module, for determining, in the process of transmitting the second image, a processing way through the image processing unit according to at least one characteristic parameter information corresponding to the first image;
- the synthesis module, for conducting, after the transmission of the second image is completed, a synthesis process for the first image and the second image through the image processing unit to obtain a corresponding synthesis image, wherein, the image processing unit is configured to change multi-spectral black-and-white images into color images through multi-spectral image color synthesis;
- the second processing module, for processing the synthesis image in accordance with the processing way.

14. The electronic device according to claim 13, wherein the second processing module is used for determining a first correction parameter with respect to the first image according to the at least one characteristic parameter information, and conducting a correcting process for the synthesis image according to the first correction parameter.

15. The electronic device according to claim 13, wherein the at least one characteristic parameter information is image luminance parameter information and/or image noise parameter information.

16. The electronic device according to claim 15, wherein when the at least one characteristic parameter information is the image luminance parameter information, the first processing module is also used for determining image grayscale information in the first image; determining the image luminance parameter information corresponding to the first image according to the image grayscale information; determining the processing way according to the image luminance parameter information.

17. The electronic device according to claim 16, wherein, the first processing module is used for determining the image luminance parameter information corresponding to the first image according to the image grayscale information, and is used for determining the number of specific pixel points according to the image grayscale information; wherein, the specific pixel points are the pixel points corresponding to a first grayscale which is more than or equal to a preset grayscale; determining a first percentage that the number of the specific pixel points accounts for the number of all the pixel points in the first image; determining the image luminance parameter information according to the first percentage.

18. The electronic device according to claim 16, wherein the first processing module is used for determining the image luminance parameter information according to the first percentage, and also used for determining whether the first percentage is bigger than a preset percentage threshold; when the first percentage is bigger the preset percentage threshold, determining an image luminance value corresponding to the image luminance parameter information as a first luminance value; when the first percentage is not bigger than the preset percentage threshold, determining an image luminance value corresponding to the luminance parameter information as a second luminance value, the second image luminance value is smaller than the first image luminance value.

19. The electronic device according to claim 18, wherein the first processing module is used for determining the processing way according to the image luminance parameter information, and is used for determining an absolute value of a difference between the first percentage and the preset percentage threshold; determining a adjusting luminance value according to the absolute value; when the image luminance value corresponding to the image luminance parameter information is the first luminance value, determining the processing way is subtracting the adjusting luminance value from an synthesis image luminance value corresponding to the synthesis image; alternatively, when the image luminance value corresponding to the image luminance parameter information is the second luminance value, determining the processing way is adding the adjusting luminance value to the synthesis image luminance value corresponding to the synthesis image.

20. The electronic device according to claim 19, wherein the second processing module is used for determining the first correction parameter with respect to the first image according to the at least one characteristic parameter information, and conducting the correcting process for the synthesis image according to the first correction parameter, and is used for determining the adjusting luminance value as the first correction parameter; conducting the correcting processing to the synthesis image according to the first correction parameter.

* * * * *